United States Patent [19]

Frigo et al.

[11] Patent Number: 5,708,753
[45] Date of Patent: Jan. 13, 1998

[54] METHOD OF RECOVERING FROM A FIBER-CABLE CUT USING RANDOM SPLICING RECONNECTION

[75] Inventors: Nicholas J. Frigo, Atlantic Highlands; Sheryl Leigh Woodward, Holmdel Township, both of N.J.

[73] Assignee: Lucent Technologies Inc., Murray Hill, N.J.

[21] Appl. No.: 718,854

[22] Filed: Sep. 24, 1996

[51] Int. Cl.$^6$ ................................................ G02B 6/00
[52] U.S. Cl. ........................... 385/147; 385/24; 385/16; 359/114; 359/154
[58] Field of Search .......................... 385/24, 16, 20, 385/31, 46, 147; 359/114, 154, 120, 118, 125

[56] References Cited

U.S. PATENT DOCUMENTS 5,136,671 8/1992 Dragone ............................ 385/46
5,559,624 9/1996 Darcie et al. ..................... 359/125

*Primary Examiner*—Phan T.H. Palmer

[57] ABSTRACT

A method of and apparatus for reconnecting a severed multi-fiber optical cable using random splicing is disclosed. Each of the fibers of a first cable section are randomly reconnected to each of the fibers of a second cable section and it is determined which fiber interconnects each of the first units to each of the second units and a reconnection database describing such interconnections is established. Using interconnection data of an original database, established prior to cable severing, together with the reconnection database, the connection of one or more inputs to the first group of first units are switched so that the resulting connections between those inputs and the second units are the same as the connections described by the original database.

18 Claims, 3 Drawing Sheets

METHOD OF RECOVERING FROM A FIBER-CABLE CUT USING RANDOM SPLICING RECONNECTION

CROSS-REFERENCE TO RELATED APPLICATIONS

Similar subject matter is disclosed in the application Ser. No. 08/572,457 filed Dec. 14, 1995 entitled "IDENTIFICATION OF DAMAGED CABLE PAIRS IN A TELECOMMUNICATIONS NETWORK AND RESTORATION OF TELEPHONE SERVICE TO SUBSCRIBERS" by Borchering et al, case 2-7-1-1, assigned to the same assignee.

TECHNICAL FIELD

The present invention relates to repairing fiber-cable cuts by the random splicing together of the fibers.

BACKGROUND OF THE INVENTION

As optical fiber is deployed deeper into the network, each fiber cable will contain more fibers. Eventually fiber cables leaving a central office (CO) will contain hundreds of fibers. As the fiber count increases, recovery from fiber-cable cuts will become more difficult. After a cable cut it takes approximately two hours to locate the cut, dispatch technicians, and excavate the site. In the cable, approximately 12 fibers are grouped into a bundle, and each fiber and bundle is color coded. Splicing the fibers back together may take anywhere from 1–15 minutes per fiber. In addition, it may be difficult to accurately identify individual fibers.

What is desired is a method of reducing the time required to repair fiber cable cuts.

SUMMARY OF THE INVENTION

In accordance with the present invention, a method and apparatus is described for reconnecting a severed multi-fiber optical cable which had provided a interconnection between a group of first units at a first location and a group of second units that are not located at the first location and may or may not be located together. Each of the fibers of a first cable section are randomly reconnected to each of the fibers of a second cable section and it is determined which fiber interconnects each of the first units to each of the second units. This interconnection data is used to establish a reconnection database. Using interconnection data of an original database, established prior to cable severing, together with the reconnection database, the connection of one or more inputs to the first group of first units are switched so that the resulting connections between those inputs and the second units are the same as the connections described by the original database.

According to one feature, "dark" fibers that do not support optical communications are identified, prior to the cable being severed, and that data is later utilized, after the cable has been spliced, to facilitate the re-establishment of proper interconnections.

DETAILED DESCRIPTION

Figure 1:
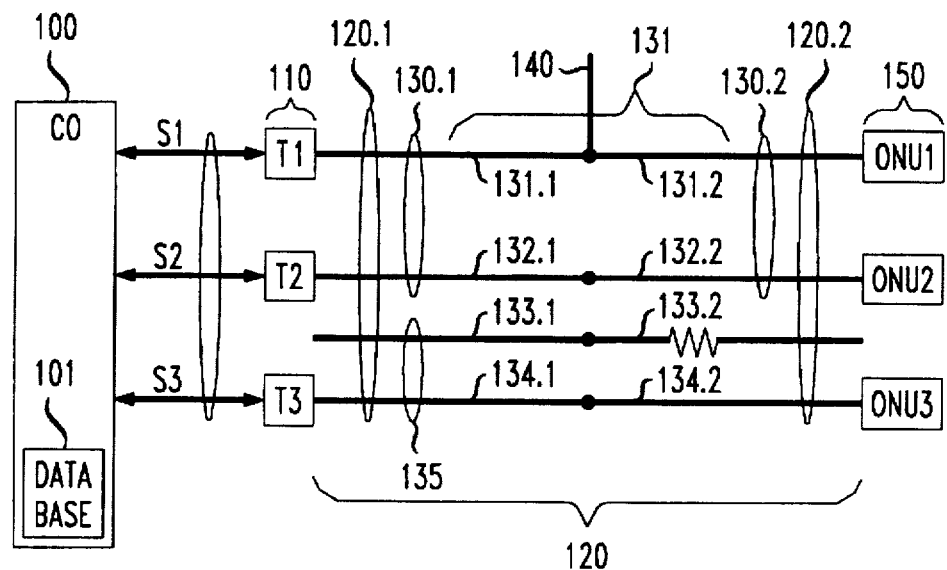
FIG. 1. shows a block diagram of a typical telephone switching system to customer connection, FIG. 2. shows an illustrative modification to the arrangement of FIG. 1 which is useful for describing how our inventive technique of random splicing may be applied to recover from a cable cut, FIG. 3. shows another illustrative modification to the arrangement of FIG. 1 which may, illustratively, utilize our random splicing technique for recovering from a cable cut.

In typical telephone switching systems, as shown in FIG. 1, the outside plant facilities (e.g., copper plant, optical fiber, etc.) used to provide the communication path from the Central Office (CO) 100 [or host-digital terminal (HDT)] to the customer 150 is tracked very carefully. Any changes in the facilities are logged, and then recorded in a database, e.g., 101. Any errors in this database will impair service, and may be difficult to correct.

In conventional long haul optical networks there are typically 16 to 96 fibers per cable 120. After a cable cut 140, it may take approximately two hours to locate the cut, dispatch technicians, and excavate the site. In the cable, approximately 12 fibers are grouped into a bundle, and each bundle, and the fibers within each bundle, is color coded. The color code matching of fibers and the splicing together of the fibers may take anywhere from 1–15 minutes per fiber. Once fiber becomes more pervasively deployed, and fiber cables contain even more fibers, it will become crucial to reduce the repair time. For cables containing more than 100 fibers color coding may not be the best way to match fibers. Also, the color coding on bundles or fibers may be damaged when a cable-cut occurs.

We have recognized that randomly splicing fibers together, without attempting to match transmitters with assigned receivers, would simplify repair operations. Furthermore, such random connections could be made without impairing the operation of the network. In accordance with our invention, each optical-network unit (ONU) is given a unique identifier (ID). These "smart" ONU's would be manufactured with the ID and other built-in intelligence. As fiber-optic plant is installed these smart ONU's are deployed (e.g., 150) between the customer and the CO 100. The use of these smart ONUs can dramatically change the way the outside plant facility is maintained.

We exploit these smart ONUs to sort out what the new facility connections are after a random-splicing repair had been performed on a severed cable. This information is used to update a customer database 101 in the CO, so that future calls would be properly routed. The database 101 in CO 100 is used to keep track of which CO transmitter/receiver (transceiver) 110 is paired with each ONU 150. Additionally, once this smart ONUs and the database 101 is in place it could be utilized to provide enhanced services and simplified network management.

Figure 2:
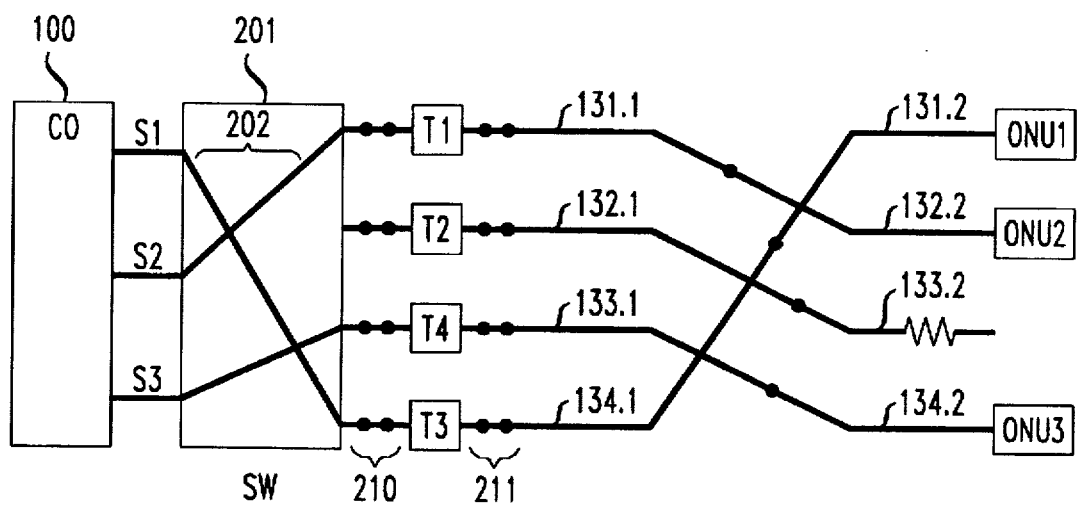

With joint reference to the simplified system block diagrams of FIGS. 1 and 2, we describe our method of providing cut fiber-cable recovery using random splicing. FIG. 1 shows a group of ONU units 150 connected over fiber cable 120 to a group of transceivers 110 which connect to CO 100. The transceivers 110 convert electrical signals S1–S3 to/from optical signals sent-over/received-over fiber cable 120. The block diagram of FIG. 2 is the same as FIG. 1 except that it includes an electronic switch 201 interposed between the existing central office switch (at CO 100) and the transceivers 110.

Prior to a severing of the cable 120, into sections 120.1 and 120.2, our FIG. 2 arrangement would have determined which optical fiber interconnects each of the transceivers units 110 to each of the ONU units 150 and have stored the data as part of the "original" customer connection data in database 101. Additionally, we identify which of the first plurality of optical fibers do not support optical communications (e.g., assumed to be fiber section 133 or 133.1 and 133.2) and stored this "dark" fiber data in database 101.

According to prior art techniques, after cable 120 had been cut 140, cable sections 120.1 and 120.2 are spliced together by careful color-matching of fiber bundles (e.g., 130.1 and 130.2) and then splicing together of color-matched fibers (e.g., 131.1 to 131.2) of those bundles. As shown in FIG. 2, and in accordance with our invention, fibers are randomly spliced together (e.g., 131.1 to 132.2, 132.1 to 133.2, etc.) eliminating the time required to color-match bundles and individual fibers.

Each transceiver (e.g., T1) at the CO 100 location polls (or interrogates) the ONU (e.g., ONU2) it is now connected to and requests that the ONU identify itself. Upon receiving this ID signal the ONU transmits its ID back to the CO 100 (i.e., transceiver T1), and this information is used to update a customer database 101. As shown in FIG. 2, since fiber 133.2 is not connected to an ONU, transceiver T2 would not receive a response. However, transceiver T3 would receive a response since ONU1 is connected via fibers 134.1 and 131.2. Since transceiver T4 connects to ONU3, via fibers 133.1 and 134.2, it receives a response. This data on the connection status of transceivers T1–T4 to ONUs 1–3 is entered into the updated customer database 101.

Electronic switch 201 uses the "original" connection database (from FIG. 1) together with the "splice reconnection" (or updated) database (from FIG. 2) to determine how to establish the proper switch connections 202 to route signals S1, S2 and S3 to, transceivers T3, T1 and T4, respectively, and then to ONU1, ONU2 and ONU3, respectively. Note, with this arrangement, unlike the arrangement of FIG. 1, a transceiver is shown connected to each fiber of cable 120. Thus, transceiver T4 is connected to ONU3 via fibers 133.1 and 134.2, even though it originally was connected to the "dark" fiber 133. The embodiment just described requires that dark fibers (those not connected to an ONU) are connected to transceivers in the CO.

An alternative is for transceiver T4 to be a "spare" transceiver that is manually connected to fiber 133.1 and manually connected to switch 201 (e.g., using an electrical cross-connect field 211) after the cable 120 has been cut. Spare transceivers would be connected to fibers which had previously been dark and would then test for the presence of ONU. Once it is determined that T2 is no longer connected to an ONU, it can be used as a spare transceiver. This reduces the number of spare transceivers required. Such optical and electrical cross-connect fields 210 and 211, respectively, may also be used to provide a manual way of correctly reconnecting transceivers to fibers (i.e., in place of switch 201) or may be used for connecting a limited number of transceiver units to only the operational (also referred to as "lit" or "bright") optical fibers.

Figure 3:
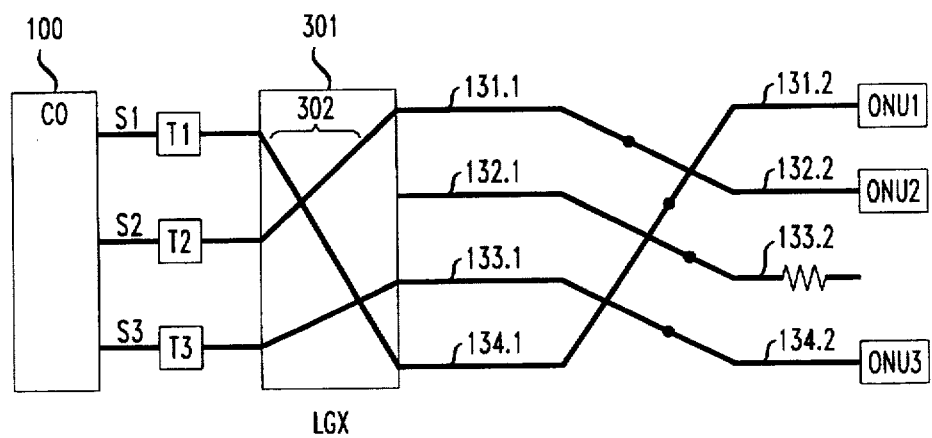

With reference to FIG. 3, we describe another arrangement for using random splicing to reestablish connections of a severed cable. In this arrangement, a light-guide cross-connect (LGX) switch 301 (optical switch) is used to provide optical signal switching needed to reestablish connections after a random-splice repair. The LGX 301 is placed between the outputs of transceivers 110 and the fiber cable 120. Rather than using the electronic switch 201 of FIG. 2 to re-route the calls, the arrangement of FIG. 3 uses LGX 301 to perform the entire recovery from a random-splice repair.

Assuming the same splicing configuration shown in FIG. 2, the LGX 301 performs optical switching of signals to route signals S1, S2 and S3, respectively, to ONU1, ONU2 and ONU3. The LGX 301 also uses the "original" connection database (from FIG. 1) together with the "reconnection" (or updated) database determined from the splicing configuration of FIG. 3 to establish the proper switch connections 302 to route signals S1, S2, and S3 to, respectively, ONU1, ONU2 and ONU3.

The general procedure for performing a random-splice repair may illustratively proceed as follows. After a cable cut occurs, the fibers are randomly spliced together. The transceivers in the CO then interrogate the ONU's to discover which ONU is connected to each transceiver. This reconnection data and the original-connection data in database 101 are used determine which connections need to be changed. This is illustrated in FIG. 3. Immediately after the random splicing is performed, T1 is connected to ONU2, T2 is connected to dark fiber and T3 is connected to ONU 1. After the interrogation step reveals this, the LGX switches the fiber connections so that T1 is now connected to ONU1 via the fiber that was connected to T3. T2 is connected to ONU2 via the fiber that was connected to T1, and T3 is switched to a fiber which had previously been dark. Since no transceiver was connected to the fiber that had been dark, T3 will interrogate that fiber to verify that it is now connected to ONU3. This final step will be repeated, with T3 testing all the available fiber which was previously dark, until the fiber now connected to ONU3 is found.

Advantageously, the use of LGX 301 does not require either the manual connection of spare transceivers (e.g., T4 of FIG. 2), or having to have a transceiver connected to each fiber at all times, as was needed in the arrangement of FIG. 2. However, to minimize reconnect time, this arrangement would require a high performance, fully automated LGX 301. Optionally, LGX 301 could be implemented using an optical cross-connect field which a craftsperson can use to manually establish or re-establish the desired connections. Clearly, the reconfiguration of the system can be performed using a combination of LGX 301 and the electronic switch 201.

Figure 4:
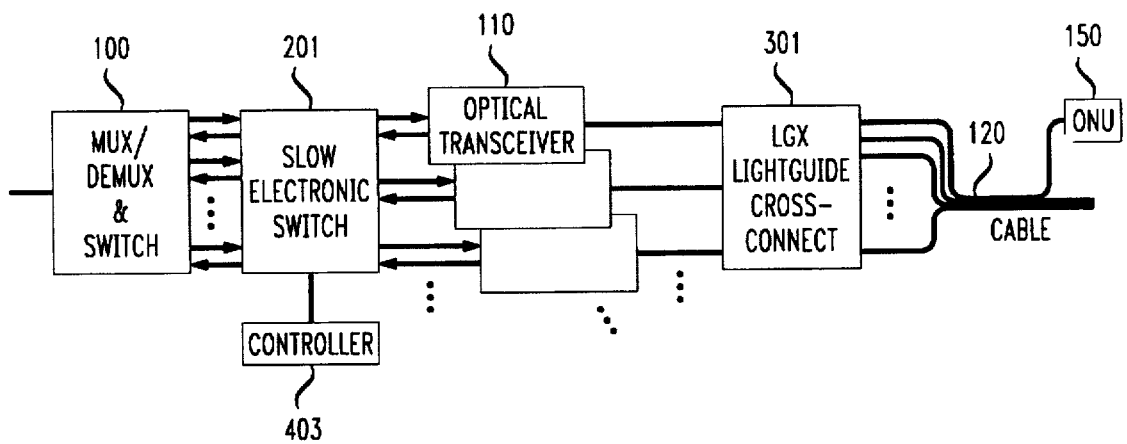
FIG. 4 shows an illustrative block diagram of a modified point-to-point optical communication system, employing one fiber per Optical Network Unit (ONU), in which our technique may be utilized.

In FIG. 4 we show a more specific block diagram of a point-to-point optical communication system employing one fiber per ONU. In FIG. 4 both the electronic switch 201 and a LGX 301 are utilized. The local telephony switch 100 may be a 5ESS, a Globeview 2000, or any other well known switch. The electronic switch 201, which is only used for rerouting connection, can be a slow switch.. Clearly switch 201's functionality could be incorporated in the local telephony switch 100; however, for clarity the two switches are drawn separately in this figure.

As previously described, after a cable cut is detected, the fibers on each side of the break are randomly spliced together as rapidly as possible. Each transceiver 110 at the CO location polls the ONU it is now connected to requesting that the ONU identify itself. Upon receiving this signal the ONU transmits its ID back to the CO location, and this information is used to update a customer database. The controller 403 of electronic switch 201, then uses the "updated" and the "original" databases to route signals to the appropriate transceivers 110. The LGX 301 in FIG. 4 may be utilized to connect "spare" transceivers to spare or dark fibers (e.g., connect transceiver T4 of FIG. 2 to fiber 133 of FIG. 1). If the number of dark fibers is small, then LGX 301 will only need to switch a few connections. In this case, LGX 301 could be a cross-connect panel requiring manual switching. Because an electronic switch 201 is far less expensive than an automated optical switch LGX 301, it would probably be more cost-effective to perform most of the switching in the electrical domain, i.e., as shown in FIG. 4, rather than in the optical domain, as shown in FIG. 2.

The above description neglects the presence of special transceivers and only briefly describes the handling of dark fiber. How to handle the dark-fiber problem depends on the system architecture. In the following paragraphs we discuss how the network would recover from a cable cut for various fiber architectures, taking into account the presence of dark fiber. If there are large numbers of dark fibers present then recovery would be simplified by bundling most of the dark fibers separately from the "lit" fiber which is currently in use. To insure that most dark and lit fibers would always be bundled separately, plans on how the dark fiber would eventually be deployed need to be developed prior to installation. To accurately predict how the dark fiber will eventually be deployed may be difficult.

In the following paragraphs, we will assume that standard transmitters, receivers and ONU's are used—where the only difference between units is their ID. The case of special transmitters will be considered in a later paragraph.

Point-to-Point; Bi-Directional Transmission

In FIG. 4, a single fiber carrying signals in both directions serves each ONU. In this system the recovery proceeds just as described above—if none or very few dark fibers are present. The random-splicing repair approach is more difficult if there is a significant amount of dark fiber in the cable.

If optical sources are emitting light from both the CO transceivers and the ONU's, then repair technicians can easily distinguish between dark fibers and bright fibers. This will be the case for the transmitters in the CO, since they will be polling the ONU's. However, the transmitters located in the ONU's might not be emitting light, either because the ONU transmits only during calls, or because each ONU contains a modulator, rather than an optical source such as a laser or LED. If each ONU contains an optical source then it is possible to work around this problem, either by having the ONU constantly transmit signals, or by having the CO poll it on a regular basis. In the latter case, the ONU could be programmed to emit a signal if it has not received any poll or other regularly scheduled signals from the CO.

Both of these scenarios (constant transmission of signals, or regular polling from the CO) might be implemented for other reasons, and could easily be exploited if a cable cut occurred. This light could be detected by the craftsperson during repair, so that the splicing is almost random, but care is taken not to splice fibers emitting light with those that do not. In this case the presence of dark fiber is not a problem.

If all the transmitters cannot be turned on, or the ONU's contain modulators, then after the cable repair is complete some of the transceivers in the CO will be connected to dark fiber. These transceivers will not be receiving a response to their polling. If there are only a small number of dark fibers present, then extra transceivers in the CO could be used to compensate for the presence of dark fiber. If there is a spare transceiver for each dark fiber (as was described in FIG. 2), then even after a random-splicing repair each ONU would still be connected to a transceiver. The database would simply record which transceivers are not presently being employed. However, because of cost and space reasons, it is unlikely that there will be many spare transceivers.

If neither of the above methods can be used, then a third approach may be followed. After the cable repair is complete, all the transceivers which are not connected to an ONU are located. These transceivers are then disconnected from those fibers, and reconnected to fibers which were dark fibers before the most recent random-splicing repair. This procedure continues until all of the ONU's are connected to transceivers. This final step could be performed using the LGX 301 shown in FIG. 4.

Point-to-Point Network; Uni-Directional Transmission

Figure 5:
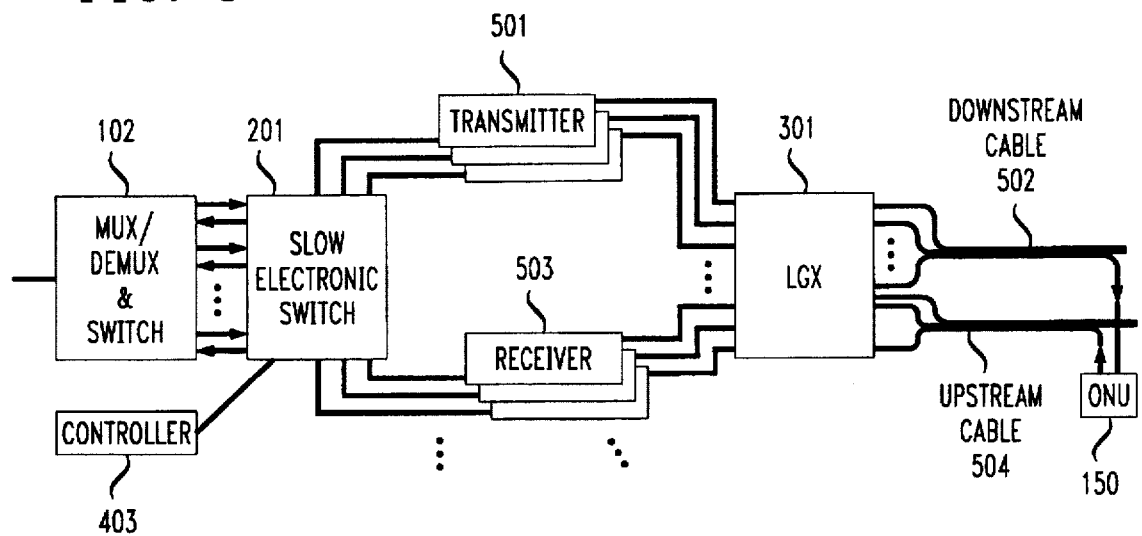
FIG. 5 shows an illustrative block diagram of a modified point-to-point optical communication system, employing separate fibers for upstream and downstream communications, in which our technique may be utilized.

FIG. 5 shows the same recovery scheme for a Point-to-Point (P-P) system which uses separate transmitters 501 and fibers 502 for downstream transmission and separate receivers 503 and fibers 504 for upstream transmission. In this case, it is important that the transmission direction of each fiber be easily determined, so that random splicing does not lead to two transmitters or two receivers being connected together. One way to differentiate between fibers 504 connected to receivers 503 and fibers 502 connected to transmitters 501 would be to have the transmitters 501 emit light throughout the repair process, as previously described. An alternative approach would be to bundle the fibers for each direction separately.

If uni-directional transmission is employed, then when each transmitter in the CO polls the ONU it must send its own ID as well. The ONU will then transmit to a random receiver in the CO the ONU ID, and the ID of the CO transmitter that it is connected to. Note that which transmitters and receivers are paired together in the CO would change after a random-splice repair.

In the case of uni-directional transmission dark fibers cannot be distinguished from fibers 504 connected to receivers 503. After a random-splicing repair, the dark fibers must be disconnected and the proper connections must be made. If we assume that there are more dark fibers than spare transmitters and receivers at the CO, a slightly more complicated process must be followed to accommodate the presence of dark fiber. If a receiver 503 does not get any response to the polling than one of the downstream or upstream fibers employed is not connected to an ONU. To discover whether it is the downstream or the upstream fiber two approaches could be taken. In the first approach, a link which is known to be working (link A) is used to isolate the problem in the malfunctioning link (link B). The downstream fiber from link A is traded with the downstream fiber from link B. If link B now works, then it is the downstream fiber originally from link B which is not connected to an ONU. If link A still works, and link B still does not work, then it is the upstream fiber of link B that is not connected to an ONU. If neither link works, then both the upstream and downstream fibers originally connected to link B are not connected to an ONU. Fibers which are no longer connected to an ONU should be designated dark fibers, and they should be replaced with fibers which were dark before the most recent random-splice repair. The problem with this approach is that a second customer must be taken off-line to repair the first. Rather than taking another customer off-line the craftsperson could simply replace each fiber until a good connection was made. This approach would be less efficient, since there is no way to know if the upstream or the downstream fiber is the source of the problem.

Passive Optical Networks

Figure 6:
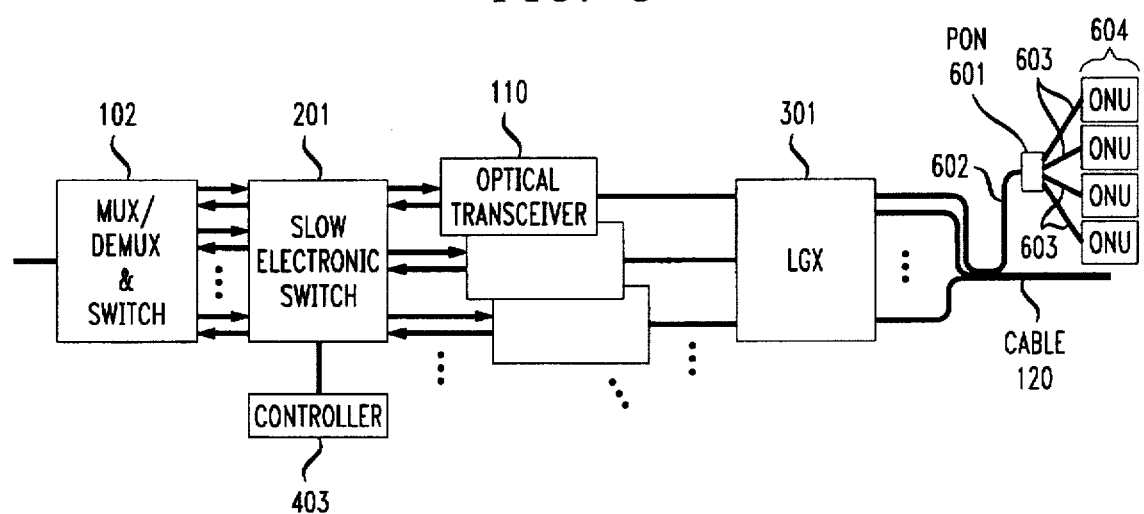
FIG. 6 shows an illustrative block diagram of a modified optical communication system, employing Passive Optical Networks (PONs) and ONUs, in which our technique may be utilized.

FIG. 6 shows an illustrative block diagram of a modified optical communication system, employing Passive Optical Network (PON) system, in which our technique may be utilized. The PON system includes splitter 601 located between the CO and ONUs 604. For most PON's, random splicing repair will still work with only minor differences. The splitter 601 may be a simple splitter, or a Wavelength-Division-Multiplexer (WDM), such as the Dragone router, as described in U.S. Pat. No. 5,136,671, entitled "Optical Switch Multiplexer and Demultiplexer," issued on Aug. 4, 1992, and incorporated by reference herein.

A fiber-cable cut can occur in either one of two locations. If it occurs before the splitter 601, i.e., 602, then recovery is almost identical to recovery in the previously described P-P system of FIG. 4. The primary difference in sorting out the connections after a random-splice repair is that ranging and other cold-start initialization procedures need to be performed before each ONU 604 can be identified.

If the cable cut occurs after the splitter 601, i.e., 603, then for some system architectures random-splicing might not be the optimal repair strategy. Cable cuts which occur after the splitter 601 are unlikely to contain large numbers of fibers, so that matching the original fibers should be practical. The well known simple technique such as color-coding could be used. Because there is no LGX between the splitter 601 and the ONUs 604 which can be used to sort out any unacceptable connections, care must be taken to insure that dark fibers and bright fibers are not connected. If uni-directional transmission is used then care must be taken to connect transmitters to receivers—and not to another transmitter, or dark fiber. Since it is difficult to distinguish between dark fiber and a receiver, it may be best to take the time to match the original fibers together. If the PON uses bi-directional transmission, and all the ONU's 604 are identical, then random-splicing repair may still be the preferred approach.

Figure 7:
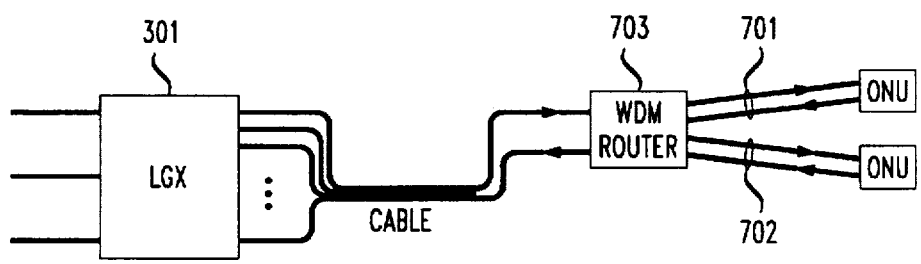
FIG. 7 shows an illustrative block diagram of a RITE-net with which the present invention may be utilized.

If a RITE-net (for example, see "A Wavelength-Division Multiplexed Passive Optical Network with Cost Shared Components," published in Photonics Technology Letters, pp. 1365–1367, November, 1994, by N. J. Frigo et. al..) is deployed (as shown in FIG. 7), using a two-fiber loop-back (701, and 702), where both directions are routed through the WDM 703, then the upstream and downstream fibers are used in pairs (701 and 702), and both members of a pair use the same wavelength.

In such an application, it is crucial that these paired fibers serve the same ONU, or the WDM router will not route the upstream signal back to the CO. It is not crucial that these pairs continue to serve the original ONU, only that they stay together. This is not a problem if the cable is made so that there is a simple way to determine which two fibers are paired together, and the transmission direction of each. This designation must be clear down the length of the fiber cable. In this case it is probably preferable to splice the original fibers together.

Special Customers

In any network there will always be a few customers who want enhanced services. These customers may require special ONU's, as well as high-performance transmitters and receivers at the CO. One way to handle these special customers is to perform the above-described random-splicing repair, which will provide them with standard services as soon as possible. After standard services have been restored, enhanced services which require the high performance transceivers can be restored using the LGX. The polling required to restore standard services will locate the fiber connected to the high performance ONU. Once located it can easily be reconnected, via LGX, to the matching high performance transceiver located in the CO. For example, with reference to FIG. 3, if we assume transceiver T1 and ONU2 are high-performance units which were originally connected together, then reestablishing that connection would merely require LGX 301 to switch the connections of transceivers T1 and T2.

Future Services

Though the entire infrastructure to implement this recovery process could probably be justified on the basis of cable-cut repair, it may be worth installing for other reasons. The ability to poll the ONU's and learn each one's ID will make the entire network more robust. The current network is reliant on a database which stores the signal route taken to every customer. If this database is destroyed it would be difficult to restore. If each ONU has a built in ID then this information would be distributed throughout the network, and the full database could be recreated easily.

If the customer premises equipment (CPE) also has built in ID's then the switch to restore service after a cable cut could also be used to provide a new service, where every customer can easily have their calls (either plain old telephony or an enhanced broadband service) forwarded to their current location. CPE could include a smart card reader, and customers could register their location by inserting their cards in the local CPE. For example, see the article by George I. Zysman, "Wireless Networks," published in Scientific American, pp. 68–71, September, 1995. The CPE would then update databases which control a switch in the local CO and the customer's home CO. Calls would then be forwarded to that CPE.

Conclusion

The present invention describes a process which speeds recovery from an optical-fiber cable cut. As the number of fibers in cables increases it may become impractical to splice fibers back together in their original configuration. Allowing the fibers to be randomly spliced together, rather than trying to match each transmitter's fiber to the appropriate receiver's fiber, should improve recovery time. This process relies on each ONU having a unique ID. The recovery time could be improved even further by having the transmitters begin polling before the splicing operation is complete. In this way some customers' service could be restored within minutes of the craft beginning repairs.

This repair strategy favors architectures in which dark and bright fibers are easily distinguished. Therefore, architectures employing single fibers to transport both upstream and downstream signals, with optical sources in the ONU are most likely to benefit from this repair strategy.

Once the infrastructure to implement this cable-cut recovery procedure is in place it could easily be used to enhance network reliability in other ways, and provide new services.

What has been disclosed is merely illustrative of the present invention. Other arrangements can be implemented by those skilled in the art without departing from the spirit and scope of the present invention.

We claim:

1. A method of reconnecting a severed cable having a first and a second cable sections including a first plurality of optical fibers, the first cable section providing a connection to a group of first units at a first location, the second cable section providing a connection to a group of second units, the method comprising the steps of:

A) randomly reconnecting each of the severed fibers of the first cable section to each of the severed fibers of the second cable section;

B) after the reconnection, determining which fiber interconnects each of the first units to each of the second units and establishing a reconnection database describing such interconnections; and C) using an established original database which specifies original interconnections between the first units and the second units together with the reconnection database, controlling the switching of connections of one or more inputs to the first units so that the resulting connections established between said inputs and the second units are the same as the connections specified by the original database.

2. The method of claim 1 wherein the first units include a group of transmitter units and a group of receiver units, wherein the first plurality of fibers includes a group of downstream fibers and a group of upstream fibers, wherein each transmitter unit is connected to a fiber of the downstream group and each receiver is connected to a fiber of an upstream fiber group, and wherein the randomly reconnecting step A a) randomly reconnects severed fibers of the first section of the downstream group only to severed fibers of the second section of the downstream group and b) randomly reconnects severed fibers of the first section of the upstream group only to severed fibers of the second section of the upstream group.

3. The method of claim 2 wherein the transmitter units emit light during the randomly reconnection step A to facilitate distinguishing severed fibers of the downstream group from severed fibers of the upstream group.

4. The method of claim 2 wherein the two groups are separately bundled.

5. The method of claim 1 wherein the first units each have the capability to interrogate a second unit to which it is connected and wherein the second units are Optical Network Units (ONUs) that each have unique identification numbers (ID) which is responded when interrogated by a first unit.

6. The method of claim 5 wherein the determining step B uses an interrogation/response sequence to determine which fiber interconnects each of the first units to each of the second units.

7. The method of claim 5 wherein the determining step B uses an interrogation/response sequence to determine which fiber interconnects each of the first units to each of the second units.

8. The method of claim 1 further comprising the step of: prior to a severing of the cable, determining which optical fiber of the first plurality of optical fibers interconnects each of the first units to each of the second units and establishing the original database describing such interconnections.

9. The method of claim 8 further comprising the step of:

identifying which of the first plurality of dark optical fibers which do not support optical communications and storing dark fiber identification data in the original database; and using the dark fiber data in step C to control the switching of connections.

10. The method of claim 1 wherein the first units each have the capability to emit light during the randomly reconnecting step A, wherein the absence of light from a fiber is used to identify severed dark fibers in the first section, and wherein no severed dark fibers are reconnected during the randomly reconnecting step A.

11. The method of claim 10 where severed dark fibers of the first section are connected to severed dark fibers of the second section.

12. The method of claim 1 wherein the second units each have the capability to emit light during the randomly reconnecting step A, wherein the absence of light from a fiber is used to identify severed dark fibers in the second section, and wherein no severed dark fibers are reconnected during the randomly reconnecting step A.

13. The method of claim 12 where severed dark fibers of the first section are connected to severed dark fibers of the second section.

14. The method of claim 1 wherein the switching step C uses an electronic switch, interposed between the one or more inputs and the first units, to establish the connections described by the original database.

15. The method of claim 14 wherein the electronic switch is implemented as part of an electronic switching system that provides the one or more inputs.

16. The method of claim 1 wherein the switching step C uses a manually operated electrical cross-connect field, interposed between the one or more inputs and the first units, to establish the connections described by the original database.

17. The method of claim 1 wherein the switching step C uses an automated optical switch, interposed between the first units and the plurality of optical fibers, to establish the connections described by the original database.

18. The method of claim 1 wherein the switching step C uses a manually operated optical cross-connect field, interposed between the first units and the plurality of optical fibers, to establish the connections described by the original database.

* * * * *